(12) United States Patent
Claudet

(10) Patent No.: US 8,915,623 B1
(45) Date of Patent: Dec. 23, 2014

(54) COVER FOR A LIGHT BULB

(75) Inventor: Ryan Claudet, Lafayette, LA (US)

(73) Assignee: St. Albert Innovations, LLC, New Iberia, LA (US)

( * ) Notice: Subject to any disclaimer, the term of this patent is extended or adjusted under 35 U.S.C. 154(b) by 254 days.

(21) Appl. No.: 13/364,180

(22) Filed: Feb. 1, 2012

(51) Int. Cl.
*F21V 15/01* (2006.01)
*F21V 15/04* (2006.01)

(52) U.S. Cl.
USPC .......................... 362/353; 362/355; 362/378

(58) Field of Classification Search
USPC ................ 362/278, 288, 311.01–311.15, 362/351–353, 355, 361–363, 374–378
See application file for complete search history.

(56) References Cited

U.S. PATENT DOCUMENTS

| | | | | |
|---|---|---|---|---|
| 2,719,908 | A * | 10/1955 | Morrison | 362/363 |
| 4,878,159 | A * | 10/1989 | Blaisdell et al. | 362/222 |
| 5,143,443 | A | 9/1992 | Madsen | |
| 5,635,262 | A * | 6/1997 | Best et al. | 428/36.92 |
| 6,296,375 | B1 | 10/2001 | Sung et al. | |
| 2002/0176256 | A1 * | 11/2002 | Gires | 362/351 |
| 2003/0175499 | A1 * | 9/2003 | Phillips | 428/323 |
| 2005/0243550 | A1 * | 11/2005 | Stekelenburg | 362/240 |
| 2009/0103313 | A1 | 4/2009 | Bernhardt et al. | |
| 2009/0257235 | A1 | 10/2009 | Wipper | |
| 2009/0284977 | A1 | 11/2009 | Daffin | |
| 2010/0002451 | A1 | 1/2010 | Reynolds | |
| 2010/0181911 | A1 * | 7/2010 | Fulop et al. | 315/51 |
| 2011/0031871 | A1 | 2/2011 | Lai et al. | |
| 2011/0044055 | A1 * | 2/2011 | Singer | 362/311.01 |
| 2011/0181172 | A1 | 7/2011 | Gruber | |
| 2011/0242823 | A1 | 10/2011 | Tracy et al. | |

* cited by examiner

*Primary Examiner* — Karabi Guharay
*Assistant Examiner* — Nathaniel Lee
(74) *Attorney, Agent, or Firm* — Roy Kiesel Ford Doody & Thurmon

(57) ABSTRACT

A more versatile cover for a light bulb, such as a compact fluorescent lamp or light emitting diode, that is aesthetically pleasing, flexible, and requires no modifications to the bulb while also capable of fitting a multitude of bulb configurations and sizes. The cover may include a hollow and at least partially elastic body in a pre-formed shape having an inner surface and an outer surface, wherein the body is removable and frictionally secured to said bulb to form an envelope around the bulb. The body may also include a collar and a bulbous section, which extends from the collar. The collar is configured to engage the base of the light bulb and create a substantially airtight seal between the base and the body. The body is fabricated from a light pervious material, and any light transmitted by the cover is preferably substantially diffuse.

34 Claims, 4 Drawing Sheets

COVER FOR A LIGHT BULB

BACKGROUND OF THE INVENTION

1. Field of the Invention

The present disclosure relates to subject matter comprised of a light source and a modifier structurally related to the light source so as to modify light therefrom, particularly a light bulb cover made of a light pervious material.

2. Description of Related Art

Non-incandescent light bulbs such as compact fluorescent light bulbs (CFLs) and light-emitting diode bulbs (LEDs) are energy-efficient alternatives to conventional incandescent bulbs. In an incandescent light bulb, light is produced by using an electric current to heat a thin filament until it is white-hot and glows. The filament is protected from the atmosphere by a glass bulb that is evacuated or filled with inert gas, which produces a warm, soft, aesthetically pleasing light.

However, one significant disadvantage associated with a conventional incandescent light bulb is that it is not energy efficient. An incandescent bulb wastes a considerable amount of energy to create the heat that lights an incandescent bulb. On the other hand, in a CFL, electric current energizes a gas, such as argon and mercury vapor, which excites a coating inside the bulb. CFLs lose very little energy to heat, so they require significantly less electricity than conventional incandescent bulbs. In general, a CFL uses about 75 percent less electricity than an incandescent bulb with the same light output, while lasting about 10 times longer. Additionally, replacing incandescent bulbs with CFLs can reduce cooling costs since CFLs produce less heat. Similarly, LEDs use less electricity and produce less heat than conventional incandescent bulbs while also producing more light. As a result of the energy savings associated with non-incandescent light bulbs, many countries, including the United States, have enacted legislation to gradually phase-out and replace incandescent light bulbs with more energy efficient light bulbs.

Like incandescent bulbs, CFLs come in a variety of shapes. Popular designs include a helical design with visible fluorescent tubes arranged in a spiral as shown in FIG. 1A. Another popular design is a tubular design as shown in FIG. 1B. However, one drawback with tubular and helical CFL designs is that many people find these designs aesthetically unpleasing because their appearance is markedly dissimilar to that of the conventional incandescent bulb. In addition, CFLs are made of glass tubing and can break if dropped or handled roughly. This complicates their disposal because they contain mercury, which is classified as a hazardous material. Similarly, many people also find LEDs aesthetically unpleasing because its appearance also represents a significant departure from that of conventional incandescent bulbs.

Another shortcoming associated with CFLs and LEDs is that many people perceive the quality of light emitted by many non-incandescent bulbs as harsh or "cold" in comparison to the warm soft light emitted by a conventional incandescent bulb. This shortcoming is mainly attributed to non-incandescent bulbs having a higher Color Correlated Temperature (CCT) than their conventional incandescent bulb counterparts. The CCT measures in Kelvin (K) the appearance of the light itself—how "warm" or "cool" it seems. Higher CCT values correlate to cooler, bluish-white light, whereas, lower CCT values correlate to warmer light. Typically, a CCT range between 2700K-3000K is considered warm or soft white, about 3500K is considered white, bright white, or medium white, about 4100K is considered cool white (bluish-white) and about 5000K-6500K is considered daylight. As a result of the CCT range differences, many purchasers are reluctant to switch from conventional incandescent bulbs to CFLs and LEDs.

Another disadvantage of CFLs and LEDs is that these bulbs generally emit light from a smaller surface area than their conventional incandescent bulb counterparts. Current CFLs and LEDs create visual "hot spots", which are bright spots in the field of view arising from light being emitted from a relatively small surface area. "Hot spots" are especially problematic for CFLs and LEDs that are typically visible such as the light bulbs on a vanity mirror fixture or bulbs on a chandelier type light fixture. Therefore, many consumers are hesitant about using CFLs and LEDs where the bulbs are likely to be in an observer's field of view.

Various solutions have been developed to enhance the appearance of non-incandescent light bulbs. One such example is a screw-on/slip-on plastic cover that is secured directly to the surface glass bulb of a CFL. Another example is a shade that attaches to the glass tube portion of a spiral shaped CFL. Another device includes a cover that includes two fingers that contact the glass tube portion of a spiral shaped CFL.

Although these covers enhance the overall appearance of a CFL, they present additional problems. Specifically, these covers increase the likelihood the glass tubing will break since the cover secures directly to the surface of the bulb, which is particularly undesirable since CFLs contain hazardous materials. Another disadvantage is that these covers cannot be reused with other CFLs. In other words, the cover must be designed specifically for each CFL bulb configuration and size. A further disadvantage, particularly with slip-on covers, is that many of the prior art covers have part-lines or seams, which may distort the light creating unsightly patterns, light intensity or color differences, and/or shadows when light is transmitted through the cover.

Additionally, some CFLs and LEDs are manufactured with hard plastic covers designed to resemble the shape of conventional bulbs. These covers screw onto the base of an existing non-incandescent light bulb. Although these covers in combination with a non-incandescent light bulb are more aesthetically pleasing, they also present additional problems. In particular, the base of the non-incandescent light bulb must be adapted to mate with the cover connection, i.e. the bulb must be manufactured with a threaded base configured to mate with the cover. As a result, these covets cannot be used with non-incandescent light bulbs without threaded bases, which presents a problem since a considerable amount of non-incandescent light bulbs are manufactured without threaded bases. Another disadvantage of these covers is they must be designed specifically for each CFL bulb configuration and size, and cannot be reused with other CFLs. A further disadvantage is that many of these covers are made of hard brittle material that can break easily, which introduces a potential safety issue. Additionally, they may discolor over time, which is not very aesthetically pleasing.

Accordingly, there remains a need in the art for more versatile cover for a non-incandescent light bulb that is aesthetically pleasing, flexible and seamless, capable of emitting light with a warm appearance and containing a broken tube and facilitating its disposal while also requiring no modifications to the bulb and capable of fitting a multitude of bulb configurations and sizes.

BRIEF SUMMARY OF THE INVENTION

An object of this invention is to provide a more versatile cover for a non-incandescent light bulb that is aesthetically pleasing. Another object of this invention is to provide a cover that is flexible and does not create unsightly patterns, light intensity or color differences, and/or shadows when light is transmitted through the cover. A further object of this invention is to provide a cover that is capable of containing a broken tube and facilitating its disposal. A further object of this invention is to provide a cover that is capable of reducing "hot spots" in the field of view of an observer. Still a further object of this invention is to provide a cover that does not require any modifications to the bulb and fits a multitude of bulb configurations and sizes. Still a further object of this invention is to provide a cover that may be capable of emitting light with a warm appearance. Additional objects and advantages of this invention shall become apparent in the ensuing descriptions of the invention.

Accordingly, a more versatile cover is provided for a light bulb, such as a compact fluorescent lamp or light emitting diode, comprising a base configured to operatively engage a socket and a glass or plastic light-emitting enclosure extending from the base. The cover is aesthetically pleasing, flexible, and requires no modifications to the bulb while also capable of fitting a multitude of bulb configurations and sizes. The cover comprises a hollow and at least partially elastic body in a pre-formed shape having an inner surface and an outer surface, wherein said body is removably and frictionally engaged to said bulb to form an envelope around the bulb. The body further comprises a collar and a bulbous section, which extends from the collar. The bulbous section and collar each have a diameter. The diameter of the bulbous section may be larger than the diameter of said collar. The collar is configured to engage the base of the light bulb and create a substantially airtight seal between the base and the body. The body is fabricated from a light pervious material, and any light transmitted by the cover is preferably substantially diffuse.

The foregoing brief summary of the invention presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented below.

Additionally, the foregoing has outlined rather broadly the features and technical advantages of the present invention in order that the detailed description of the invention that follows may be understood. Additional features and advantages of the invention will be described hereinafter, which form the subject of the claims of the invention. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features, which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE SEVERAL VIEWS OF THE DRAWING(S)

The accompanying drawings illustrate preferred embodiments of this invention. However, it is to be understood that these embodiments are not intended to be exhaustive, nor limiting of the invention. These embodiments are but examples of some of the forms in which the invention may be practiced.

DETAILED DESCRIPTION OF THE INVENTION

Figure 1C:
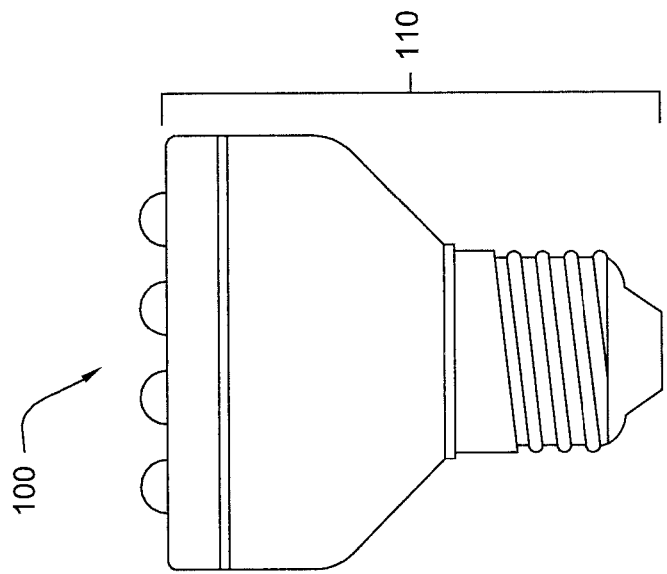
FIG. 1C shows a prior art light bulb comprising multiple LEDs.
Figure 1B:
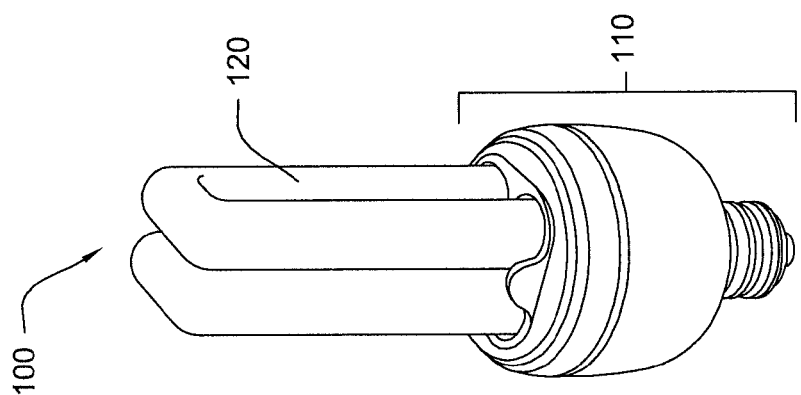
FIG. 1B depicts a prior art CFL with a tubular design.
Figure 1A:
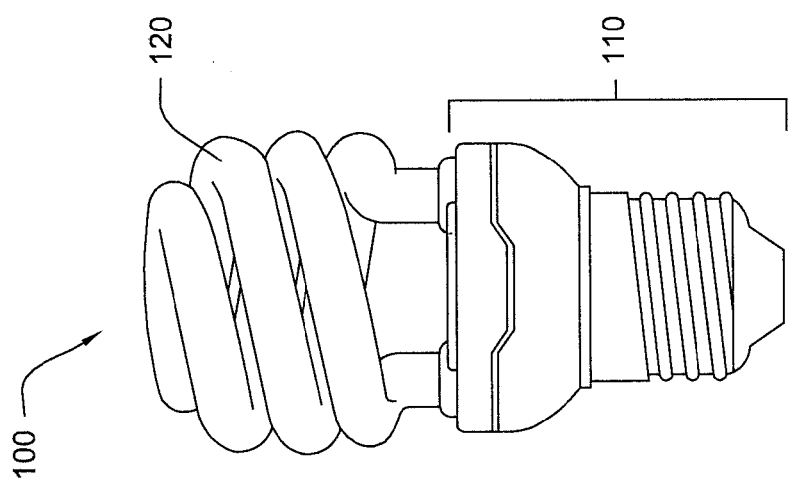
FIG. 1A depicts a prior art CFL with a helical design having fluorescent tubes arranged in a spiral.

The claimed subject matter is now described with reference to the drawings, wherein like reference numerals are used to refer to like elements throughout. FIG. 1A, FIG. 1B and FIG. 1C illustrate various embodiments of non-incandescent light bulbs that may be used with a cover 200 in accordance with this invention. FIG. 1A shows a typical compact fluorescent light bulb (CFL) with a helical design including fluorescent tubes arranged in a spiral. FIG. 1B depicts a CFL with a tubular design. FIG. 1C shows a light-emitting diode bulb (LED).

As illustrated in FIGS. 1A-1C, the non-incandescent light bulb 100 comprises a base 110 configured to operatively engage a socket or plug and a glass or plastic light-emitting enclosure 120, such as a tube, extending from the base 110. In the embodiments illustrated in FIG. 1A and FIG. 1B, the light-emitting enclosure 120 may be filled with gas, such as argon and mercury vapor, and the inside of the light-emitting enclosure 120 may have a coating that converts ultraviolet radiation to visible light by florescence. In the embodiment shown in FIG. 1C, the light-emitting enclosure 120 may comprise a semiconductor structure that produces light when electrons move around within the semiconductor structure.

Turning now to FIGS. 2A-2D, a cover for a light bulb in accordance with this invention is shown generally at 200. The cover 200 comprises a hollow and at least a partially elastic body 210 in a preformed shape having an inner surface 211 and an outer surface 212. The cover 200 can be easily attached to the light bulb and enhances the appearance of a non-incandescent light bulb, such as those shown in FIGS. 1A-1C.

Another aspect of this invention is that the cover 200 may be also configured so that any light transmitted by it is substantially diffuse. The cover 200 has a light emitting surface area greater than the surface area of the light emitting enclosure 120 of the non-incandescent bulb 100, which reduces the light intensity emitted from a non-incandescent bulb thereby reducing the potential for "hot spots" and producing a more aesthetically pleasing light to an observer. Once the cover 200 is secured to the non-incandescent bulb 100, the observer perceives the light emitted from the larger light emitting surface area of the cover and not the smaller surface area of the light emitting enclosure.

The percent reduction in perceived light intensity is about proportional to the percent increase of the surface area of the cover in relation to the surface area of the light emitting enclosure of the non-incandescent bulb. In a preferred embodiment, the cover 200 is used with a typical a 13 watt non-incandescent CFL with a light emitting enclosure having a surface area of about 15.5-21 in$^2$ (100-135.5 cm$^2$). In this embodiment, the cover 200 is configured to have a light emitting surface area of about 23-24 in$^2$ (148.4-154.8 cm$^2$). The cover 200 increases the light emitting surface area by about 12 to 52 percent thereby reducing the perceived light intensity by a proportional amount.

In another preferred embodiment, the cover 200 is used with a typical a 15 watt non-incandescent CFL with a light emitting enclosure having a surface area of about 19-25 in$^2$ (122.5-161.2 cm$^2$). In this embodiment, the cover 200 is configured to have a light emitting surface area of at least about 32 in$^2$ (206.4 cm$^2$). The cover 200 increases the light emitting surface area by about 28 to 68 percent thereby reducing the perceived light intensity by a proportional amount.

In another preferred embodiment, the cover 200 is used with a typical a 26 watt non-incandescent CFL with a light emitting enclosure having a surface area of about 32-38 in$^2$ (206.4-245.1 cm$^2$). In this embodiment, the cover 200 is configured to have a light emitting surface area of at least about 80 in$^2$ (206.4 cm$^2$). The cover 200 increases the light emitting surface area by about 110 to 150 percent thereby reducing the perceived light intensity by a proportional amount.

Figure 2A:
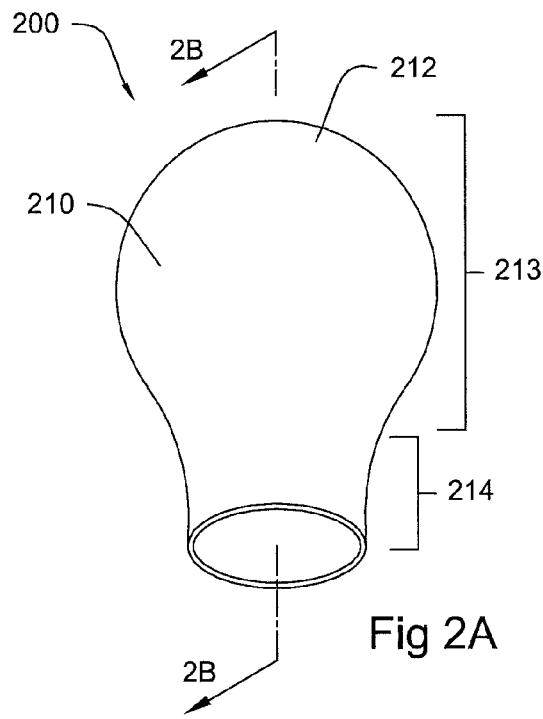
FIG. 2A illustrates a perspective view of a cover for a non-incandescent light bulb in accordance with this invention.
Figure 2B:
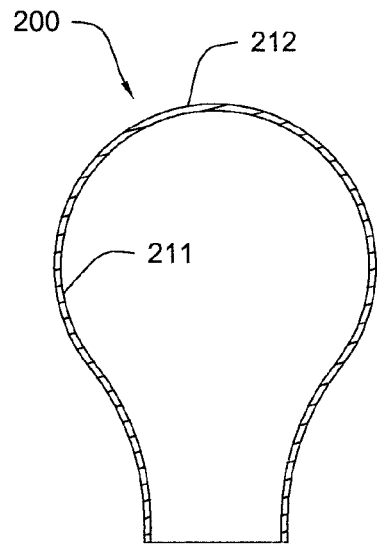
FIG. 2B illustrates a cross-sectional view of a cover for a non-incandescent light bulb in accordance with this invention.
Figure 2C:
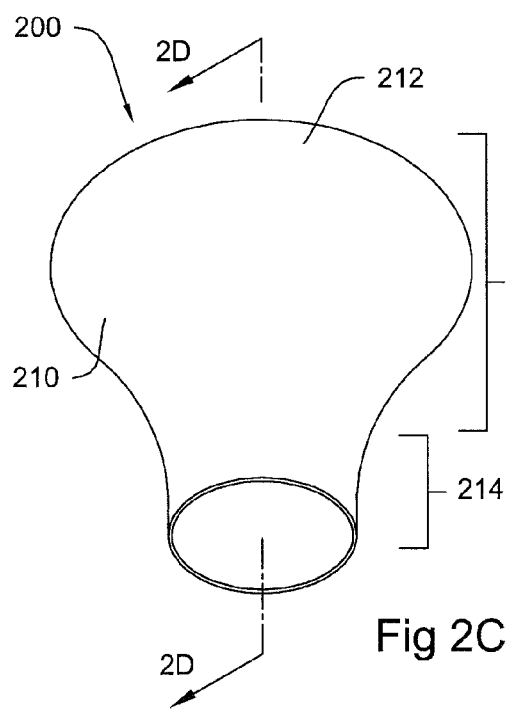
FIG. 2C illustrates a perspective view of an alternate embodiment of a cover for a non-incandescent light bulb in accordance with this invention.
Figure 2D:
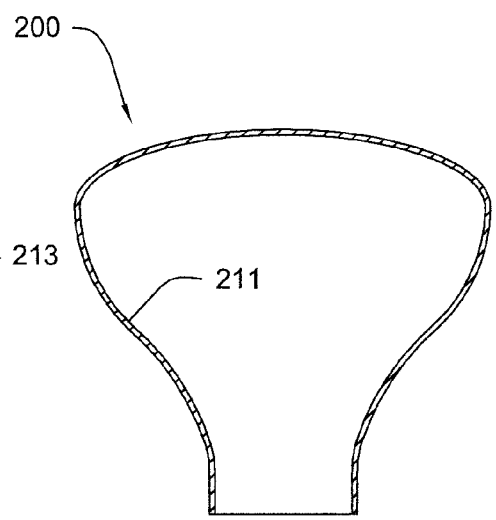
FIG. 2D illustrates a cross-sectional view of an alternate embodiment of a cover for a non-incandescent light bulb in accordance with this invention.
Figure 3A:
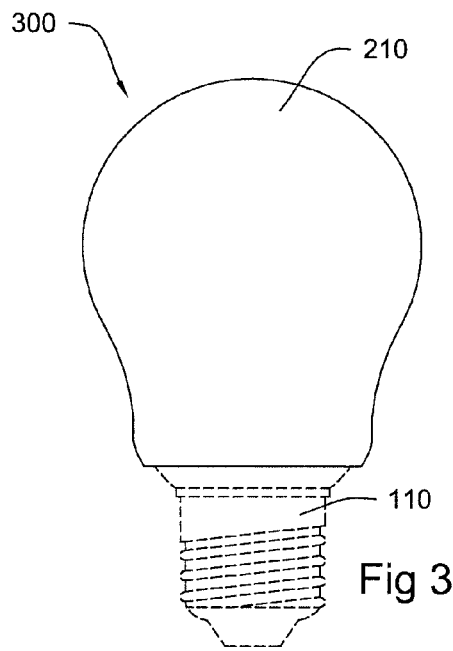
FIG. 3A illustrates a perspective view of a light bulb assembly comprising the cover of FIG. 2A secured to the non-incandescent light bulb of FIG. 1A.
Figure 3B:
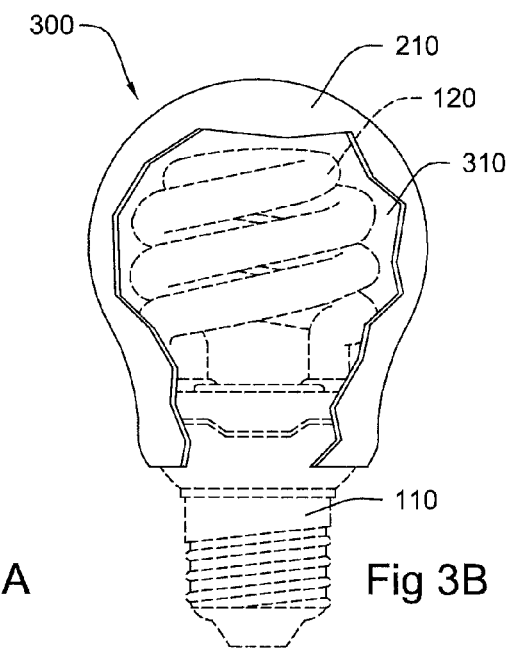
FIG. 3B illustrates a cutaway view of the light bulb assembly as shown in FIG. 3A.
Figure 3C:
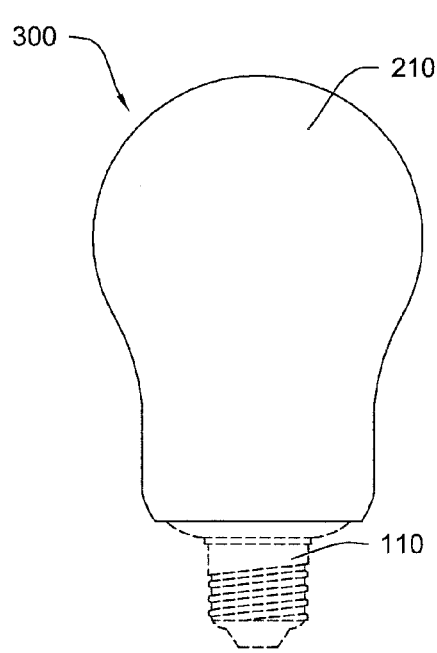
FIG. 3C illustrates a perspective view of a light bulb assembly comprising the cover of FIG. 2A secured to the non-incandescent light bulb of FIG. 1B.
Figure 3D:
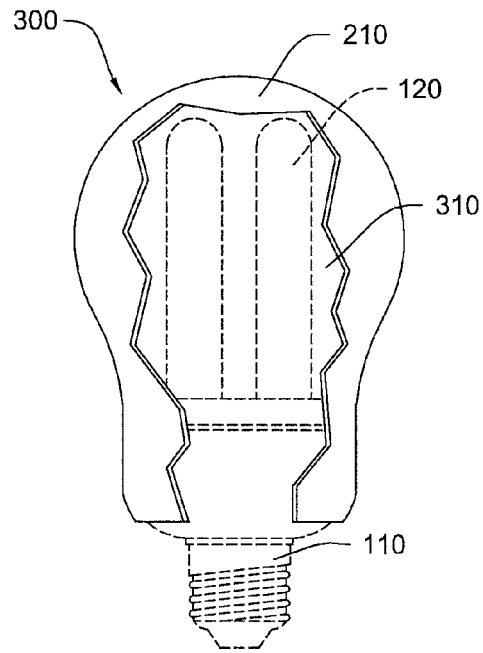
FIG. 3D illustrates a cutaway view of the cover as shown in FIG. 3C.
Figure 3F:
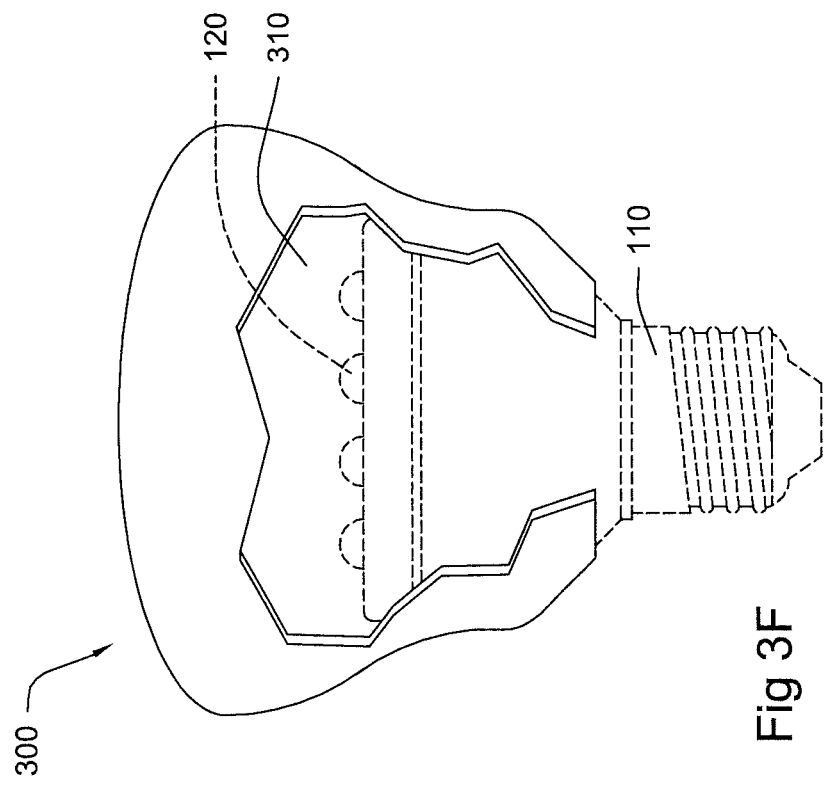
FIG. 3F illustrates a cutaway view of the cover as shown in FIG. 3E.
Figure 3E:
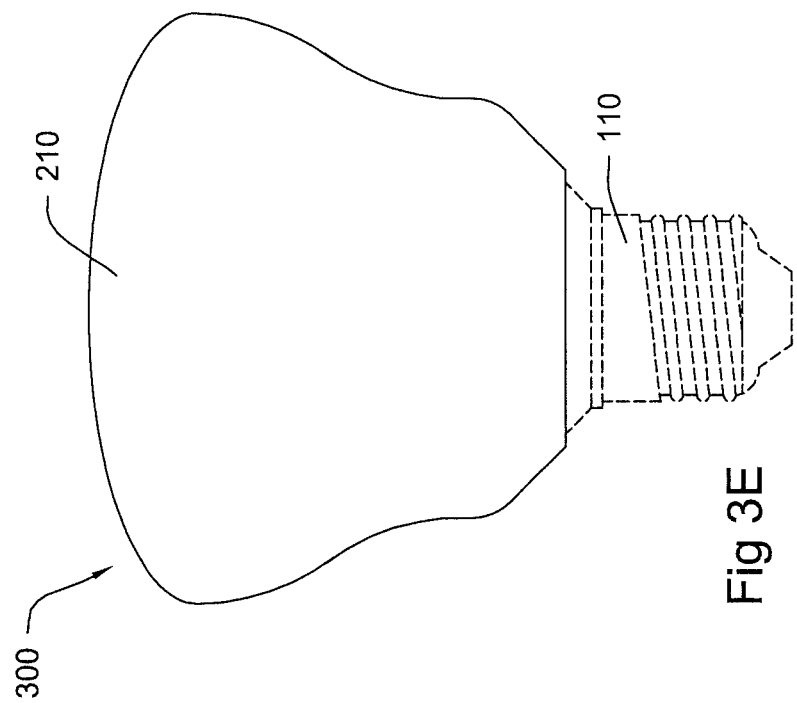
FIG. 3E illustrates a perspective view of a light bulb assembly comprising the cover of FIG. 2B secured to the non-incandescent light bulb of FIG. 1C.

The cover 200 may be preformed in any desired shape; however, it is preferably a bulbous shape similar to that of a conventional light bulb. For example, in a preferred embodiment shown in FIG. 2A and FIG. 2B, the cover 200 may be shaped like a conventional incandescent light bulb. FIG. 2C and FIG. 2D show an alternate embodiment of the cover 200 shaped like a recessed light bulb or flood light.

The body 210 further comprises a collar 214 and a bulbous section 213, which extends from the collar 214. The bulbous section 213 and collar 214 are preferably seamlessly connected to one another. The bulbous section 213 and collar 214 may be seamlessly connected to one another using any conventional molding means or methods for producing articles without molding seams. Examples include, but are not limited to, molding the body 210 using a single one-piece die. The body 210 may also be substantially free of any part-lines or seams to prevent any light transmitted through the body 210 from becoming distorted, creating unsightly patterns, shadows, or light intensity differences. Similar molding means and methods as those discussed above may be employed to ensure the body is substantially free of any part-lines or seams. Additionally, both the bulbous section 213 and collar 214 each have a diameter. In a preferred embodiment as illustrated in FIGS. 2A-2D, the diameter of the bulbous section 213 may be larger than the diameter of the collar 214.

With reference now to FIGS. 3A-3F, a light bulb cover assembly in accordance with this invention is illustrated generally at 300. The light bulb assembly 300 comprises a cover 200 secured to a non-incandescent light bulb 100. The body 210 is removably and frictionally secured to the base 110 of the light bulb 100 by the collar 214 to form an envelope around the light-emitting enclosure 120. The collar 214 is configured to engage the base 110 of the light bulb 100 and create a substantially airtight seal between the base 110 and the body 210. In a preferred embodiment, the collar 214 substantially conforms to the shape of the base 110 of the bulb 100 to create the seal. The sealing force is created when the elastic collar 214 attempts to resume its normal shape after being stretched to fit over the light bulb 100.

When the body 210 is secured to the base 110, the inner surface 211 of the body 210 and the light-emitting enclosure 120 define a void 310 between the inner surface 211 and light-emitting enclosure 120, i.e. the inner surface 211 does not contact the light-emitting enclosure 120. The void 310 is preferably sized so that it has sufficient volume to contain any materials or other waste materials that may result from a broken light-emitting enclosure 120 within the envelope. The volume of the void 310 may be increased by enlarging the diameter of the bulbous section 213 thereby increasing the distance between the inner surface 211 and the light-emitting enclosure 120. Conversely, the void 310 may be decreased by reducing the diameter of the bulbous section 213.

The body 210 may be preformed and fabricated from a moldable material using any conventional molding means such as injection molding, blow molding, vacuum molding, compression molding, and so forth. Both the bulbous section 213 and collar 214 may be fabricated from the same material; however, they may also be fabricated from different materials. For example, the collar 214 may be fabricated from an elastic material and the bulbous section 213 may be fabricated from another material such as a hard plastic material.

Suitable materials useful in the fabrication of the present disclosure are substantially light pervious or translucent materials that are capable of transmitting between about 30 percent about 85 percent of the visible light emitted by the light bulb 100. For example, when a light source with a light intensity of about 30 foot-candle is transmitted through the body, the light is diffused to a light intensity of about 10-26 foot-candle. In addition, the material is preferably capable of resuming its normal shape spontaneously after contraction, dilatation, or distortion. In a preferred embodiment, the material has a melting point of at least about 160 degrees Fahrenheit, a tensile strength of at least about 50 psi, preferably 265 psi, and a percent elongation of at least about 160. Examples of preferred materials include, but are not limited to, silicone or mixtures thereof. In an alternate embodiment, the body 210 may be fabricated from a material with a melting point of at least about 100 degrees Fahrenheit, a tensile strength of at least about 50 psi, and a percent elongation of at least about 120. Example alternate materials include, but are not limited to, plastic materials such as polyurethane and mixtures thereof.

As those of ordinary skill in the art will appreciate, percent elongation may be determined by stressing a material of an initial length until it fractures at a final length. The percent elongation of a material is then calculated by subtracting the initial length (Li) from the final length (Lf) and dividing it by the initial length (Li) and multiplying it by 100, i.e. 100*(Lf−Li)/Li. For example, if the initial length of a material is 5 inches and the material is stretched until it fractures at a length of 13 inches, then the percent elongation of the material is 160, i.e. 100*(13 inches−5 inches)/5 inches.

The inside surface 211 of the cover 200 may be partially or completely colored with a pigment or coating. In an alternate embodiment, the entire body 210 may be colored with pigment or coating. In a preferred embodiment, the inside surface 211 may be partially colored with a silver color or coated with a reflective coating to achieve a spot light effect. In this embodiment, the inner surface 211 of the side walls of the bulbous section 213 are coated or colored and the inner surface 211 of the bottom wall of the bulbous section 213 is not provided with a color or coating. In this manner, any light transmitted from the light bulb is directed towards the area of the bulbous section 213 without color or coating, which achieves a flood light effect.

The cover 200 may also be partially or completed fabricated from a material that includes a pigment or coating configured to make the cover substantially transparent, preferably at least about 85 percent transparent. For example, in a preferred embodiment, the cover 200 may be fabricated from a substantially transparent material. In an alternate embodiment, the transparent material may also be provided with a white or slightly off-white pigment or coating to produce a cover 200 with a slightly frosted appearance.

In addition, the cover 200 may be partially or completely fabricated from a material that includes a pigment or coating configured to enhance the quality of the light transmitted through the cover 200. The pigment or coating may be selected so that the light transmitted through the cover 200 has a higher CCT (cooler) or a lower CCT (warmer) as desired. The configuration of the pigment or coating depends mostly on the CCT rating of the non-incandescent bulb and the appearance of the light that the observer desires. Preferably, the cover 200 alters the CCT value by about 0K to 3500K, and reduces light intensity by about 0 percent to about 40 percent.

In a preferred embodiment, the cover 200 may be provided with a white or slightly off-white pigment or coating. The pigment or coating provided to the cover 200 enhances the light quality of a light source by altering or blocking undesired light wavelengths as light is transmitted from the light source through the cover 200, which in turn changes light having a cooler blueish-white (higher CCT value) appearance to a light having warmer softer white appearance (lower CCT value). For example, when the cover 200 is used with a 13-watt CFL having a CCT of about 6500K, the cover 200 may be provided with a silicone oil based pigment or coating with a yellow/red (orange) tint to alter the CCT to about 2700K, i.e. a warmer or softer light. The alteration of the CCT value also reduces the light intensity of the CFL. Prior to securing the cover 200 to the 13-watt CFL, the CFL was tested and found to emit a light with an intensity of about 4.5 foot-candle at about 5 feet away from the CFL. After installing the cover 200, the light intensity was reduced to about 2.5 to 2.7 foot-candle at about 5 feet away from the CFL, i.e. about a 36-40% reduction in light intensity.

Alternatively, a cover 200 may be provided with pigment or coating to alter a light with a warmer softer white appearance (lower CCT value) to a light having a cooler blueish-white (higher CCT value). For example, when the cover 200 is used with a 13-watt CFL having a CCT of about 2700K, the cover 200 may be provided with a silicone oil based pigment or coating with a blue/white (light blue) tint to alter the CCT to about 6200K. Similar to the prior example, the light intensity of the CFL is reduced when the cover 200 is used to alter. Prior to securing the cover 200 to the 13-watt CFL, the CFL was tested and found to emit a light with an intensity of about 4.5 foot-candle at about 5 feet away from the CFL. After installing the cover 200, the light intensity was reduced to about 2.5 to 2.7 foot-candle at about 5 feet away from the CFL, i.e. about a 36-40% reduction in light intensity.

In operation, the cover 200 is secured to a non-incandescent light bulb 100 by stretching the collar 214 over the light-emitting enclosure 120. The collar 214 is stretched over the light-emitting enclosure 120 and base 110 of the light bulb 100. The collar 214 is preferably stretched by a force inducing means, such as a person's fingers or a mechanical device, until the diameter of the collar 214 exceeds the diameter of the light bulb 100, so that the collar 214 does not contact and damage the light-emitting enclosure 120. Once the collar 214 passes over the light-emitting enclosure 120 and is substantially aligned with the base 110, the force that is stretching the collar 214 may be removed or released thereby allowing the collar 214 to contract and frictionally secure the body 210 to the base 110. The collar 214 substantially conforms to the base 110 of the light bulb 100. The elastic nature of the collar 214 creates a sealing force when the collar 214 attempts to resume its normal shape after being stretched over the light bulb 100. In addition, the elasticity of the collar 214 also allows the cover to be used and reused with a variety of light bulb sizes and configurations. The sealing force creates a substantially airtight seal between the body 210 and base 100 and forms an envelope around the light-emitting enclosure 120. Once the body 210 is secured to the base 110, the inner surface 211 of the body 210 and the light-emitting enclosure 120 define a void 310 between the inner surface 211 and light-emitting enclosure 120, i.e. the inner surface 211 does not contact the light-emitting enclosure 120. The void 310 is preferably sized so that it has sufficient volume to contain any materials or other waste materials that may result from a broken light-emitting enclosure 120 within the envelope.

The cover 200 is preferably removed from the light bulb 100 by stretching the collar until its diameter exceeds the diameter of the light bulb 100. Again, the collar 214 may stretched by a force inducing means, such as a person's fingers or a mechanical device. Once the diameter of the collar 214 exceeds that of the light bulb 100, the cover 200 may be removed from the light bulb. In this manner, the cover 200 does not contact and damage the light-emitting enclosure 120 thereby preventing the enclosure 120 from breaking and potentially releasing broken glass or other hazardous materials into the surrounding environment.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A cover for a light bulb comprising a base configured to operatively engage a socket and a light-emitting enclosure extending from said base, wherein said cover comprises:
   a. a hollow and at least partially elastic body in a pre-formed shape having an inner surface and an outer surface, wherein said body is configured to removably and frictionally engage said bulb to form an envelope around said light-emitting enclosure and to create a substantially airtight seal between said bulb and said body.

2. A cover for a light bulb according to claim 1 wherein said inner surface of said body and said light-emitting enclosure define a void between said body and said light-emitting closure when said cover is in place over said bulb.

3. A cover for a light bulb according to claim 2 wherein said cover is configured to have a light emitting surface area greater than said light-emitting enclosure.

4. A cover for a light bulb according to claim 3 wherein said body further comprises a collar configured to engage said base.

5. A cover for a light bulb according to claim 4 wherein said body further comprises a bulbous section extending from said collar.

6. A cover for a light bulb according to claim 5 wherein said bulbous section and said collar each have a diameter and wherein said diameter of said bulbous section is larger than said diameter of said collar.

7. A cover for a light bulb according to claim 6 wherein said collar and said bulbous section are seamlessly connected.

8. A cover for a light bulb according to claim 7 wherein said body is comprised of a material having a melting point of at least about 100 degrees Fahrenheit.

9. A cover for a light bulb according to claim 8 wherein said body is comprised of a material having a percent elongation of at least about 120.

10. A cover for a light bulb according to claim 9 wherein said body is comprised of a material having a tensile strength of at least about 50 psi.

11. A cover for a light bulb according to claim 10 wherein said light transmitted by cover is substantially diffuse.

12. A cover for a light bulb according to claim 11 wherein said light emitting surface area of said cover is about 12 to 150 percent greater than the surface area of said light-emitting enclosure.

13. A cover for a light bulb according to claim 12 wherein said cover is translucent.

14. A cover for a light bulb according to claim 13 wherein said body is configured to transmit between about 30 percent to about 85 percent of the visible light emitted by said bulb.

15. A cover for a light bulb according to claim 14 wherein said cover is configured to alter the CCT value of the light emitted by said bulb by up to about 3500K.

16. A cover for a light bulb according to claim 15 wherein said cover is configured to reduce the CCT value of the light emitted by said bulb by up to about 3500K.

17. A cover for a light bulb according to claim 15 wherein said cover is configured to reduce the light intensity of the light emitted by said bulb by up to about 40 percent.

18. A cover for a light bulb according to claim 12 wherein said cover is substantially transparent.

19. A cover for a light bulb according to claim 12 wherein said bulb is a fluorescent lamp.

20. A cover for a light bulb according to claim 12 wherein said bulb is a light emitting diode.

21. A cover for a light bulb comprising a base configured to operatively engage a socket and light-emitting enclosure extending from said base, wherein said cover comprises:
   a. a hollow and at least partially elastic body in a pre-formed shape having an inner surface and an outer surface, wherein said body comprises a collar configured to removably and frictionally engage said base to form an envelope around said light-emitting enclosure, wherein said collar is configured to create a substantially airtight seal between said base and said body.

22. A cover for a light bulb according to claim 21 wherein said inner surface of said body and said light-emitting enclosure define a void between said body and said light-emitting enclosure when said cover is in place over said bulb.

23. A cover for a light bulb according to claim 22 wherein said light transmitted by cover is substantially diffuse.

24. A cover for a light bulb according to claim 23 wherein said light emitting surface area of said cover is about 12 to 150 percent greater than the surface area of said light-emitting enclosure.

25. A cover for a light bulb according to claim 23 wherein said cover is translucent.

26. A cover for a light bulb according to claim 25 wherein said body is configured to transmit between about 30 percent to about 85 percent of the visible light emitted by said bulb.

27. A cover for a light bulb according to claim 26 wherein said cover is configured to alter the CCT value of the light emitted by said bulb by up to about 3500K.

28. A cover for a light bulb according to claim 27 wherein said cover is configured to reduce the CCT value of the light emitted by said bulb by up to about 3500K.

29. A cover for a light bulb according to claim 28 wherein said cover is configured to reduce the light intensity of the light emitted by said bulb by up to about 40 percent.

30. A cover for a light bulb according to claim 29 wherein said body is comprised of a material having a melting point of at least about 100 degrees Fahrenheit, a percent elongation of at least about 120, and a tensile strength of at least about 50 psi.

31. A cover for a light bulb according to claim 23 wherein said cover is substantially transparent.

32. A cover for a light bulb according to claim 31 wherein said body is comprised of a material having a melting point of at least about 100 degrees Fahrenheit, a percent elongation of at least about 120, and a tensile strength of at least about 50 psi.

33. A light bulb assembly comprising:
   a. a light bulb comprising a base configured to operatively engage a socket and a light-emitting enclosure extending from said base; and,
   b. a cover comprising a hollow and at least partially elastic body in a pre-formed shape having an inner surface and an outer surface, wherein said body is configured to removably and frictionally engage to said bulb to form an envelope around said light-emitting enclosure and to create a substantially airtight seal between said bulb and said body, said body is configured to have a light emitting surface area greater than said light-emitting enclosure of said light bulb, and said body is at least partially fabricated from a material having a melting point of at least about 100 degrees Fahrenheit, a percent elongation of at least about 120 and a tensile strength of at least about 50 psi, wherein said cover is configured to alter the CCT value of the light emitted by said light bulb by up to about 3500K and said cover is configured to reduce the light intensity of the light emitted by said bulb by up to about 40 percent.

34. A cover for a light bulb according to claim 33 wherein said cover is configured to reduce the CCT value of the light emitted by said light bulb by up to about 3500K.

* * * * *